United States Patent
Shi et al.

(10) Patent No.: US 11,546,044 B2
(45) Date of Patent: Jan. 3, 2023

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Yun Fang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/193,121

(22) Filed: Mar. 5, 2021

(65) Prior Publication Data

US 2021/0194566 A1  Jun. 24, 2021

Related U.S. Application Data

(63) Continuation of application No. PCT/CN2018/105775, filed on Sep. 14, 2018.

(51) Int. Cl.
*H04B 7/08* (2006.01)
*H04B 7/06* (2006.01)
*H04B 17/318* (2015.01)
(Continued)

(52) U.S. Cl.
CPC .......... *H04B 7/088* (2013.01); *H04B 7/0626* (2013.01); *H04B 17/318* (2015.01);
(Continued)

(58) Field of Classification Search
CPC .... H04B 7/088; H04B 7/0626; H04B 17/318; H04B 17/336; H04B 7/0695;
(Continued)

(56) References Cited

U.S. PATENT DOCUMENTS

| 2014/0274030 A1 | 9/2014 | Aminzadeh et al. |
| 2018/0138962 A1* | 5/2018 | Islam .................. H04B 7/0695 |

(Continued)

FOREIGN PATENT DOCUMENTS

| CN | 108513737 | 9/2018 |
| CN | 110324908 A | 10/2019 |

OTHER PUBLICATIONS

Huawei et al., "Discussion on BFR for Scell", 3GPP TSG RAN WG1 Meeting #94, R1-1809120, Aug. 2018, 6 Pages.
(Continued)

*Primary Examiner* — Harry H Kim
(74) *Attorney, Agent, or Firm* — Hodgson Russ LLP

(57) ABSTRACT

Embodiments of the present disclosure provide a wireless communication method, a terminal device, and a network device. The method is applied to a CA scenario, and there are at least one primary cell and at least one secondary cell for serving a terminal device. The method comprises: determining, by the terminal device, whether there is a candidate beam that satisfies a first condition among at least one candidate beam when a beam failure occurs in a first secondary cell, wherein the first condition is that at least one of RSRP, RSRQ, and SINR of a signal is greater than a first threshold, and the first secondary cell belongs to the at least one secondary cell; and determining, by the terminal device, whether to perform beam failure recovery for the first secondary cell according to a determination result.

14 Claims, 5 Drawing Sheets

200

Determining, by the terminal device, whether there is a candidate beam that satisfies a first condition among at least one candidate beam when a beam failure occurs in a first secondary cell, wherein the first condition is that at least one of RSRP, RSRQ, and SINR of a signal is greater than a first threshold, and the first secondary cell belongs to the at least one secondary cell — S210

Determining, by the terminal device, whether to perform beam failure recovery for the first secondary cell according to a determination result — S220

(51) Int. Cl.
| | |
|---|---|
| *H04B 17/336* | (2015.01) |
| *H04L 5/00* | (2006.01) |
| *H04W 24/10* | (2009.01) |
| *H04W 74/08* | (2009.01) |
| *H04W 76/19* | (2018.01) |
| *H04W 36/00* | (2009.01) |
| *H04W 74/00* | (2009.01) |
| *H04B 17/327* | (2015.01) |
| *H04W 36/30* | (2009.01) |
| *H04W 76/15* | (2018.01) |

(52) U.S. Cl.
CPC ........... *H04B 17/336* (2015.01); *H04L 5/001* (2013.01); *H04W 24/10* (2013.01); *H04W 74/0833* (2013.01); *H04W 76/19* (2018.02)

(58) Field of Classification Search
CPC ..... H04B 17/327; H04L 5/001; H04L 5/0023; H04L 5/0048; H04W 24/10; H04W 74/0833; H04W 76/19; H04W 36/0069; H04W 74/006; H04W 36/305; H04W 76/15
See application file for complete search history.

(56) References Cited

U.S. PATENT DOCUMENTS

| | | | |
|---|---|---|---|
| 2019/0254064 A1* | 8/2019 | Islam | H04W 16/00 |
| 2020/0275319 A1* | 8/2020 | Murray | H04B 7/0695 |
| 2021/0314049 A1* | 10/2021 | Matsumura | H04W 24/10 |

OTHER PUBLICATIONS

Oppo, "Discussion on the Reply to 'LS On Termination of Contention-Free BFR'", 3GPP TSG RAN WG1 Meeting #94, R1-1808884, Aug. 2018, 2 Pages.
Vivo, "Discussion On the Scell BFR", 3GPP TSG-RAN Meeting #102, R2-1807584, May 2018, 5 Pages.
WIPO, ISR and WO for PCT/2018/105775, Mar. 19, 2020.
LG Electronics Inc., "Remaining issue on Beam Failure Recovery for Scell," 3GPP TSG-RAN WG2 Meeting #102, R2-1808354, May 2018.
CNIPA, First Office Action for CN Application No. 201880097082. 2, dated Oct. 10, 2022.

* cited by examiner

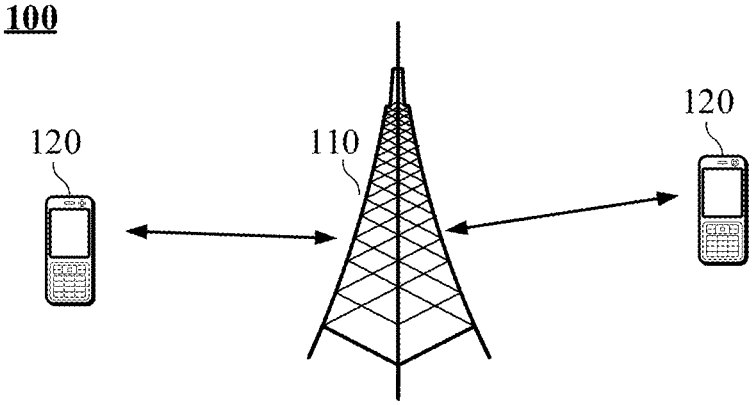

Determining, by the terminal device, whether there is a candidate beam that satisfies a first condition among at least one candidate beam when a beam failure occurs in a first secondary cell, wherein the first condition is that at least one of RSRP, RSRQ, and SINR of a signal is greater than a first threshold, and the first secondary cell belongs to the at least one secondary cell  ~ S210

Determining, by the terminal device, whether to perform beam failure recovery for the first secondary cell according to a determination result  ~ S220

Start

S310

Sending, by the terminal device, first information to a network device on at least one cell other than a first secondary cell when a beam failure occurs in the first secondary cell and it is determined that there is no candidate beam that satisfies a first condition among at least one candidate beam, wherein the first information is used for indicating a beam condition on the first secondary cell, and the first secondary cell belongs to the at least one secondary cell End

FIG. 3

Receiving, by the terminal device, first configuration information sent by a network device, wherein the first configuration information is used for indicating the terminal device to perform a first beam failure recovery procedure or a second beam failure recovery procedure when a beam failure occurs in a first secondary cell, and the first secondary cell belongs to the at least one secondary cell  ~ S410

Performing, by the terminal device, beam failure recovery for the first secondary cell according to the first configuration information when the beam failure occurs in the first secondary cell  ~ S420

Start

Sending, by a network device, first configuration information that assists the terminal device in performing beam failure recovery for a first secondary cell to the terminal device, wherein the first secondary cell belongs to the at least one secondary cell  / S510

End

FIG. 5

WIRELESS COMMUNICATION METHOD, TERMINAL DEVICE AND NETWORK DEVICE

CROSS-REFERENCE TO RELATED APPLICATIONS

This application is a continuation of International Application No. PCT/CN2018/105775, filed on Sep. 14, 2018, the entire disclosure of which is incorporated by reference herein.

TECHNICAL FIELD

The present disclosure relates to the field of communications, and more particularly, to a wireless communication method, a terminal device and a network device.

BACKGROUND

In New Radio Release 15 (NR Rel 15), a beam failure recovery (BFR) procedure is standardized for a serving cell. However, how to achieve the BFR procedure when there are multiple serving cells simultaneously is an urgent problem to be solved, for example, there may be a primary cell (PCell) for a master cell group (MCG), a primary secondary cell (PSCell) and a secondary cell (SCell) for a secondary cell group (SCG) simultaneously under a carrier aggregation (CA) scenario.

SUMMARY

A first aspect provides a wireless communication method, which is applied to a CA scenario, and there are at least one primary cell and at least one secondary cell for serving a terminal device. The method includes:

determining, by the terminal device, whether there is a candidate beam that satisfies a first condition among at least one candidate beam when a beam failure occurs in a first secondary cell, wherein the first condition is that at least one of reference signal receiving power (RSRP), reference signal receiving quality (RSRQ), and signal to interference plus noise ratio (SINR) of a signal is greater than a first threshold, and the first secondary cell belongs to the at least one secondary cell; and determining, by the terminal device, whether to perform beam failure recovery for the first secondary cell according to a determination result.

A second aspect provides a wireless communication method, which is applied to a CA scenario, and there are at least one primary cell and at least one secondary cell for serving a terminal device. The method includes:

sending, by the terminal device, first information to a network device on at least one cell other than a first secondary cell when a beam failure occurs in the first secondary cell and it is determined that there is no candidate beam that satisfies a first condition among at least one candidate beam, wherein the first information is used for indicating a beam condition on the first secondary cell, and the first secondary cell belongs to the at least one secondary cell.

A third aspect provides a wireless communication method, which is applied to a CA scenario, and there are at least one primary cell and at least one secondary cell for serving a terminal device. The method includes:

receiving, by the terminal device, first configuration information sent by a network device, wherein the first configuration information is used for indicating the terminal device to perform a first beam failure recovery procedure or a second beam failure recovery procedure when a beam failure occurs in a first secondary cell, and the first secondary cell belongs to the at least one secondary cell; and performing, by the terminal device, beam failure recovery for the first secondary cell according to the first configuration information when the beam failure occurs in the first secondary cell.

A fourth aspect provides a wireless communication method, which is applied to a CA scenario, and there are at least one primary cell and at least one secondary cell for serving a terminal device. The method includes:

sending, by a network device, first configuration information that assists the terminal device in performing beam failure recovery for a first secondary cell to the terminal device, wherein the first secondary cell belongs to the at least one secondary cell.

A fifth aspect provides a wireless communication method, which is applied to a CA scenario, and there are at least one primary cell and at least one secondary cell for serving a terminal device. The method includes:

receiving, by a network device, first information sent by the terminal device on at least one cell other than a first secondary cell when a beam failure occurs in the first secondary cell and it is determined that there is no candidate beam that satisfies a first condition among at least one candidate beam, wherein the first information is used for indicating a beam condition on the first secondary cell, and the first secondary cell belongs to the at least one secondary cell.

A sixth aspect provides a wireless communication method, which is applied to a CA scenario, and there are at least one primary cell and at least one secondary cell for serving a terminal device. The method includes:

sending, by a network device, first configuration information to the terminal device, wherein the first configuration information is used for indicating the terminal device to perform a first beam failure recovery procedure or a second beam failure recovery procedure, and the first secondary cell belongs to the at least one secondary cell.

A seventh aspect provides a terminal device, configured to perform the method in the first aspect or any of the implementations thereof.

Specifically, the terminal device includes a functional module configured to perform the method in the first aspect or any of the implementations thereof.

An eighth aspect provides a terminal device, configured to perform the method in the second aspect or any of the implementations thereof.

Specifically, the terminal device includes a functional module configured to perform the method in the second aspect or any of the implementations thereof.

A ninth aspect provides a terminal device, configured to perform the method in the third aspect or any of the implementations thereof.

Specifically, the terminal device includes a functional module configured to perform the method in the third aspect or any of the implementations thereof.

A tenth aspect provides a network device, configured to perform the method in the fourth aspect or any of the implementations thereof.

Specifically, the network device includes a functional module configured to perform the method in the fourth aspect or any of the implementations thereof.

An eleventh aspect provides a network device, configured to perform the method in the fifth aspect or any of the implementations thereof.

Specifically, the network device includes a functional module configured to perform the method in the fifth aspect or any of the implementations thereof.

A twelfth aspect provides a network device, configured to perform the method in the sixth aspect or any of the implementations thereof.

Specifically, the network device includes a functional module configured to perform the method in the sixth aspect or any of the implementations thereof.

A thirteenth aspect provides a terminal device, including a processor and a memory. The memory is configured to store a computer program, and the processor is configured to call and run the computer program stored in the memory to execute the method in the first aspect or any of the implementations thereof.

A fourteenth aspect provides a terminal device, including a processor and a memory. The memory is configured to store a computer program, and the processor is configured to call and run the computer program stored in the memory to execute the method in the second aspect or any of the implementations thereof.

A fifteenth aspect provides a terminal device, including a processor and a memory. The memory is configured to store a computer program, and the processor is configured to call and run the computer program stored in the memory to execute the method in the third aspect or any of the implementations thereof.

A sixteenth aspect provides a network device, including a processor and a memory. The memory is configured to store a computer program, and the processor is configured to call and run the computer program stored in the memory to execute the method in the fourth aspect or any of the implementations thereof.

A seventeenth aspect provides a network device, including a processor and a memory. The memory is configured to store a computer program, and the processor is configured to call and run the computer program stored in the memory to execute the method in the fifth aspect or any of the implementations thereof.

An eighteenth aspect provides a network device, including a processor and a memory. The memory is configured to store a computer program, and the processor is configured to call and run the computer program stored in the memory to execute the method in the sixth aspect or any of the implementations thereof.

A nineteenth aspect provides a chip, configured to perform the method in any one of the first to sixth aspects or any of the implementations thereof.

Specifically, the chip includes: a processor, configured to call and run a computer program from a memory, so that a device installed with the chip performs the method in any one of the first to sixth aspects or any of the implementations thereof.

A twentieth aspect provides a computer-readable storage medium, configured to store a computer program that causes a computer to perform the method in any one of the first to sixth aspects or any of the implementations thereof.

A twenty-first aspect provides a computer program product, including computer program instructions, which cause the computer to perform the method in any one of the first to sixth aspects or any of the implementations thereof.

A twenty-second aspect provides a computer program which, when runs on a computer, causes the computer to perform the method in any one of the first to sixth aspects or any of the implementations thereof.

BRIEF DESCRIPTION OF THE DRAWINGS

FIG. 1 is a schematic diagram of a communication system architecture provided by an embodiment of the present disclosure.

FIG. 2 is a schematic flowchart of a wireless communication method provided by an embodiment of the present disclosure.

FIG. 3 is a schematic flowchart of another wireless communication method provided by an embodiment of the present disclosure.

FIG. 4 is a schematic flowchart of still another wireless communication method provided by an embodiment of the present disclosure.

FIG. 5 is a schematic flowchart of still another wireless communication method provided by an embodiment of the present disclosure.

DETAILED DESCRIPTION

Figure 6:
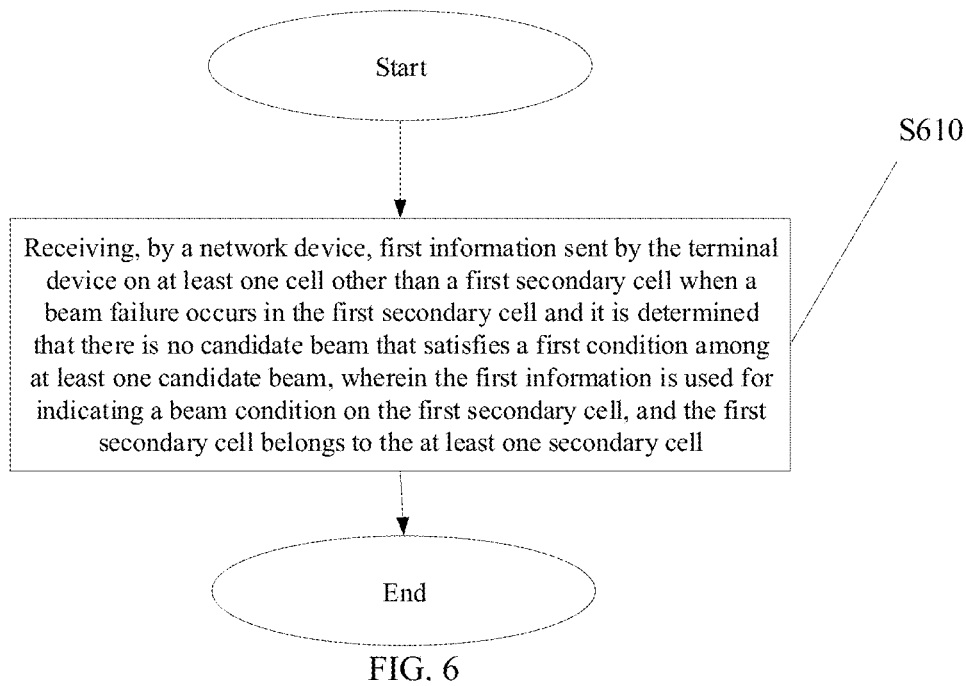
FIG. 6 is a schematic flowchart of still another wireless communication method provided by an embodiment of the present disclosure.

The technical solutions in the embodiments of the present disclosure will be described below with reference to the accompanying drawings in the embodiments of the present disclosure. Obviously, the described embodiments are part of the embodiments of the present disclosure, but not all of the embodiments. Based on the embodiments in the present disclosure, all other embodiments obtained by a person of ordinary skill in the art without creative efforts shall fall within the protection scope of the present disclosure.

The embodiments of the present disclosure may be applied to a variety of communications systems, such as a Global System for Mobile communications (GSM) system, a Code Division Multiple Access (CDMA) system, a Wideband Code Division Multiple Access (WCDMA) system, a General Packet Radio Service (GPRS), a Long Term Evolution (LTE) system, an advanced long term evolution (LTE-A) system, a New Radio (NR) system, a NR Evolution system, a LTE-based access to unlicensed spectrum (LTE-U) system, a NR-based access to unlicensed spectrum (NR-U) system, a Universal Mobile Telecommunication System (UMTS), a wireless local area network (WLAN), wireless fidelity (WiFi), a next-generation communication system, other communication systems, or the like.

Generally speaking, traditional communication systems support a limited number of connections and are easy to be implemented. However, with the development of communication technologies, the mobile communication system will not only support traditional communications, but also support communications, such as device to device (D2D) communications, machine to machine (M2M) communications, machine type communications (MTC), and vehicle to vehicle (V2V) communications, or the like. The embodiments of the present disclosure may also be applied to these communications systems.

Optionally, a communication system in the embodiments of the present disclosure may be applied to a carrier aggregation (CA) scenario, may also be applied to a dual connectivity (DC) scenario, and may also be applied to a standalone (SA) networking scenario.

The embodiments of the present disclosure do not limit applied frequency spectrum. For example, the embodiments of the present disclosure may be applied to licensed spectrum or unlicensed spectrum.

Exemplarily, a communication system 100 applied in an embodiment of the present invention is shown in FIG. 1. The communication system 100 may include a network device 110. The network device 110 may be a device communicating with a terminal device 120 (or referred to as a communication terminal or a terminal). The network device 110 may provide communication coverage to a specific geographic region, and may communicate with the terminal device located within the coverage region.

FIG. 1 exemplarily illustrates one network device and two terminal devices. Optionally, the communication system 100 may include a plurality of network devices, and a coverage range of each network device may include other numbers of terminal devices, which is not limited by the embodiment of the present disclosure.

Optionally, the communication system 100 may also include other network entities such as a network controller and a mobile management entity, which is not limited by the embodiment of the present invention.

It should be understood that a device having a communication function in a network/system in the embodiment of the present invention may be referred to as a communication device. The communication system 100 shown in FIG. 1 is taken as an example. The communication device may include a network device 110 and a terminal device 120 which have communication functions. The network device 110 and the terminal device 120 may be the above-mentioned specific devices, and descriptions thereof are omitted here. The communication device may also include other devices in the communication system 100, such as other network entities including a network controller, a mobile management entity, and the like, which is not limited by the embodiment of the present invention.

In the embodiments of the present disclosure, various embodiments are described in conjunction with the terminal device and network device. The terminal device may also be referred to as user equipment (UE), an access terminal, a user unit, a user station, a mobile station, a mobile platform, a remote station, a remote terminal, a mobile device, a user terminal, a terminal, a wireless communication device, a user agent, a user apparatus or the like. The terminal device may be a station (ST) in a WLAN, a cellular phone, a cordless telephone, a session initiation protocol (SIP) telephone, a wireless local loop (WLL) station, a personal digital assistant (PDA), a handheld device having a wireless communication function, a computation device or other processing devices connected to a radio modem, a vehicle device, a wearable device, a terminal device in a next-generation communication system such as a NR network, a terminal device in the PLMN that will be evolved in the future, and the like.

As an example without a limitation, in the embodiments of the present disclosure, the terminal device may also be a wearable device. The wearable devices may also be referred as a wearable smart device. It is a general term for using wearable technology to intelligently design everyday wear and develop wearable devices, such as glasses, gloves, watches, clothing and shoes. The wearable device is a portable device that is directly worn on the body or integrated into user's clothes or accessories. The wearable device is not only a hardware device, but also realizes powerful functions through software support, data interaction, and cloud interaction. In a broad sense, the wearable smart device includes for example a smart watch or smart glasses with full functions, a large-size, which can achieve complete or partial functions without relying on smart phones, and for example various smart bracelets and smart jewelry for physical sign monitoring that only focus on a certain type of application function, and needs to cooperate with other devices such as a smart phone.

The network device may be a device used for communicating with a mobile device. The network device may be may be an access point (AP) in WLAN, a base transceiver station (BTS) in GSM or CDMA, or a NodeB (NB) in WCDMA, or an evolutional Node B (eNB or eNodeB) in LTE, or a relay station or an access point, or a vehicle device, a wearable device, a gNB in the NR network or a network device in a PLMN that will be evolved in the future, and the like.

In the embodiments of the present disclosure, the network device provides services for a cell, and the terminal device communicates with the network device through transmission resources (for example, frequency domain resources, or spectrum resources) used by the cell. The cell may be a cell corresponding to a network device (for example, a base station), and the cell may belong to a macro base station or a base station corresponding to a small cell. The small cell here may include: a metro cell, a micro cell, a pico cell, a femto cell, and the like. These small cells have characteristics of small coverage and low transmit power, and are suitable for providing high-rate data transmission services.

In the NR Rel-15, for one serving cell, a beam failure recovery (BFR) procedure is standardized. Specifically, the BFR procedure includes the followings.

First step, beam failure detection.

Specifically, a terminal device measures a channel state information reference signals (CSI-RS) and/or a synchronization signal block/physical broadcast channel block (SS/PBCH block) to determine whether quality of corresponding physical downlink control channel (PDCCH) meets a predetermined/configured threshold. For example, it is assumed that hypothetical block error ratio performance is worse than the threshold.

Second Step, new candidate beam identification.

Specifically, the terminal device selects a new beam that meets the predetermined/configured threshold through the CSI-RS and/or the SS/PBC block. For example, RSRP/

RSRQ/SINR of layer 1 (L1-RSPR/L1-RSRQ/L1-SINR) meets a certain condition, for example, L1-RSRP is better than a certain threshold.

Optionally, if the new beam meeting the condition is selected, a third step is executed.

Optionally, if the new beam meeting the condition is not selected, a contention-based random access process is adopted.

Third step, beam failure recovery request transmission.

The terminal device selects one physical random access channel (PRACH) corresponding to the new beam to initiate transmission of contention-free random access or report the new beam selected by itself through a physical uplink control channel (PUCCH), Fourth step, the terminal device detects a response from the network device.

It should be noted that whether there is any beam failure (that is, the above first step) is determined based on the quality of the beam associated with the PDCCH (in a protocol, it is determined by a reference signal corresponding to the beam, such as CSI-RS resource, SSB, or the like).

It should be noted that the beam failure recovery procedure may also be referred to as a link recovery procedure.

For simplicity of description, in the subsequent description (including the claims), when a beam failure occurs, the beam failure recovery procedure mentioned generally refers to one or more subsequent procedures after the above first step, excluding the above first step, since the above first step has been reflected in the condition of "when a beam failure occurs".

It should be understood how to achieve the BFR procedure when there are multiple serving cells simultaneously is an urgent problem to be solved, for example, there may be a PCell for a MCG, a PSCell and a SCell for a SCG simultaneously under a CA scenario. Based on the above problem, the present disclosure proposes a BFR procedure that can be applied to the CA scenario, which can increase the probability of BFR success, thereby improving the performance of the BFR.

FIG. 2 is a schematic flowchart of a wireless communication method 200 according to an embodiment of the present disclosure. As shown in FIG. 2, the method 200 is applied to a CA scenario, and there are at least one primary cell and at least one secondary cell for serving a terminal device. The method 200 may include:

S210, determining, by the terminal device, whether there is a candidate beam that satisfies a first condition among at least one candidate beam when a beam failure occurs in a first secondary cell, wherein the first condition is that at least one of RSRP, RSRQ, and SINR of a signal is greater than a first threshold, and the first secondary cell belongs to the at least one secondary cell; and S220, determining, by the terminal device, whether to perform beam failure recovery for the first secondary cell according to a determination result.

Specifically, the terminal device determines whether there is the candidate beam that satisfies the first condition among the at least one candidate beam by measuring CSI-RS and/or a synchronization signal block.

Optionally, the first threshold is pre-configured or configured by a network device.

Optionally, in an embodiment of the present disclosure, if it is determined that there is no first beam that satisfies the first condition among the at least one candidate beam, the terminal device determines not to perform the beam failure recovery for the first secondary cell.

Optionally, in an embodiment of the present disclosure, the terminal device determines to perform the beam failure recovery for the first secondary cell when it is determined that there is no first beam that satisfies the first condition among the at least one candidate beam, or when it is determined that there is the first beam that satisfies the first condition among the at least one candidate beam.

In other words, regardless of the determination result, the terminal device performs the beam failure recovery for the first secondary cell.

Optionally, in an embodiment of the present disclosure, the terminal device may perform the beam failure recovery for the first secondary cell based on configuration of the network device in combination with the determination result.

As an example, the terminal device receives first configuration information sent by a network device, wherein the first configuration information is used for configuring no-contention based at least one first PRACH signal and at least one second PRACH signal, and wherein the at least one first PRACH signal corresponds to the at least one candidate beam, respectively.

Optionally, in this example, the at least one first PRACH signal may correspond to the at least one candidate beam in a one-to-one correspondence, respectively.

Optionally, in this example, the at least one second PRACH signal may be independent of the at least one candidate beam.

Optionally, in this example, the terminal device performs random access based on the first PRACH signal corresponding to the first beam if it is determined that there is the first beam that satisfies the first condition among the at least one candidate beam; or the terminal device selects one second PRACH signal from the at least one second PRACH signal for the random access by if it is determined that there is no beam that satisfies the first condition among the at least one candidate beam.

Optionally, if the terminal device selects one second PRACH signal from the at least one second PRACH signal for the random access, the terminal device does not need to listen to search space for beam failure recovery (search space for BFR) defined on control resource set for the beam failure recovery (CORESET-BFR).

Optionally, if the terminal device selects one second PRACH signal from the at least one second PRACH signal for the random access, the terminal device receives first signaling sent by the network device through another cell other than the first secondary cell, and the first signaling indicates the terminal device to perform measurement or report, or activation configuration, or configuration on the first secondary cell; and the terminal device performs a corresponding procedure on the first secondary cell in response to the first signaling.

It should be noted that, in response to the first signaling, the terminal device may measure the first secondary cell, and may measure the first secondary cell and report the measurement result. The terminal device may also perform the activation configuration on the first secondary cell, for example, Beam1, Beam2, and Beam3 are configured, and the Beam2 is activated for transmission at this time. The terminal device may also configure the first secondary cell, for example, the Beam1 is configured for transmission.

Optionally, in this example, the terminal device receives first indication information sent by the network device, and the first indication information is used for indicating to activate a transmission configuration indicator (TCI) state or for indicating to configure the TCI state.

It should be noted that the TCI state may be used for indicating Quasi-co-located (QCL) information, and the QCL information may be divided into 4 types, for example, Type A-Type D, and the Type D is used for cooperating with the terminal device for beam reception.

For example, the first indication information is at least one of radio resource control (RRC) signaling, media access control element (MAC CE) signaling, and physical layer downlink control information (DCI).

As another example, the terminal device receives second configuration information sent by the network device, and the second configuration information is used for configuring a no-contention based PRACH signal corresponding to each of the at least one candidate beam.

Optionally, in this example, the terminal device performs the random access based on the PRACH signal corresponding to the first beam if it is determined that there is the first beam that satisfies the first condition among the at least one candidate beam; or the terminal device performs the random access based on the PRACH signal corresponding to the candidate beam with the best quality among the at least one candidate beam if it is determined that there is no beam that satisfies the first condition among the at least one candidate beam; or the terminal device performs the random access based on the PRACH signal corresponding to the candidate beam selected by itself from the at least one candidate beam if it is determined that there is no beam that satisfies the first condition among the at least one candidate beam.

As another example, the third configuration information is used to configure a no-contention based PRACH signal corresponding to each of the at least one candidate beam on multiple cells.

It should be noted that in this example, the multiple cells may or may not include the first secondary cell, which is not limited in the embodiments of the present disclosure.

Optionally, in this example, the terminal device determines the PRACH signal corresponding to the first beam according to a first rule, and performs the random access based on a PRACH corresponding to the first beam if it is determined that there is the first beam that satisfies the first condition among the at least one candidate beam.

Optionally, in this example, the first rule includes:

that the PRACH signal corresponding to the first beam is selected by the terminal device itself, or that the PRACH signal in a same cell as the first beam is preferentially selected as the PRACH signal corresponding to the first beam, or that the PRACH signal configured on a primary cell for a master cell group and the PRACH signal configured on a primary secondary cell for a secondary cell group are preferentially selected as the PRACH signal corresponding to the first beam, and the PRACH signal configured on a secondary cell is secondly selected as the PRACH signal corresponding to the first beam, or that a sequence of selecting the following as the PRACH signal corresponding to the first beam is: the PRACH signal configured on the primary cell for the master cell group>the PRACH signal configured on the primary secondary cell for the secondary cell group>the PRACH signal configured on the secondary cell, or that the PRACH signal corresponding to the first beam is selected according to a cell identification sequence, or that the PRACH signal corresponding to the first beam is selected according to an identification sequence of carriers corresponding to a cell.

It should be noted that, in an embodiment of the present disclosure, the PRACH signal may include a preamble, and may also include time domain or frequency domain resources.

It should be noted that, for the PCell and the PSCell, there are generally contention-based PRACH resources, and for the SCell that needs the BFR, it is inter-band with PCell/PSCell, so the beam may be different, and it also does not have contention-based PRACH resources.

In other words, for the PCell/PSCell, when no suitable beam is selected from the candidate beams, the beam can be automatically sent on the contention-based PRACH resources. For the SCell, when no suitable beam is selected from the candidate beams, and there is no contention-based PRACH resource for the SCell, therefore, when the beam failure occurs in the SCell, signal transmission needs to be performed in combination with the solution of the present disclosure.

Therefore, in the embodiments of the present disclosure, the BFR procedure may be applied to the scenario with multiple serving cells to increase the probability of BFR success, thereby improving the beam failure recovery performance.

FIG. 3 is a schematic flowchart of a wireless communication method 300 according to an embodiment of the present disclosure. As shown in FIG. 3, the method 300 is applied to a CA scenario, and there are at least one primary cell and at least one secondary cell for serving a terminal device. The method 300 may include:

S310, sending, by the terminal device, first information to a network device on at least one cell other than a first secondary cell when a beam failure occurs in the first secondary cell and it is determined that there is no candidate beam that satisfies a first condition among at least one candidate beam, wherein the first information is used for indicating a beam condition on the first secondary cell, and the first secondary cell belongs to the at least one secondary cell.

Optionally, the first information is that the beam failure has occurred on the first secondary cell, or the first information is that the beam failure has occurred on the first secondary cell, and there is no beam that satisfies the first condition among the at least one candidate beam, or the first information is that the beam failure has occurred on the first secondary cell, and is quality information of some or all of the at least one candidate beam.

It should be noted that the terminal device sends the first information to the network device, so that the network device may learn that the beam failure has occurred in the first secondary cell, and there is no candidate beam that meets the condition.

Optionally, the first condition is that at least one of RSRP, RSRQ, and SINR of a signal is greater than a first threshold.

Optionally, the first threshold is pre-configured or configured by the network device.

Optionally, in an embodiment of the present disclosure, the terminal device receives first signaling sent by the network device through another cell other than the first secondary cell, wherein the first signaling indicates the terminal device to perform measurement or report, or activation configuration, or configuration on the first secondary cell; and the terminal device performs a corresponding procedure on the first secondary cell in response to the first signaling.

Further, the terminal device receives first indication information sent by the network device, wherein the first indication information is used for indicating to activate a TCI state or for indicating to configure the TCI state.

For example, the first indication information is at least one of RRC signaling, MAC CE signaling, and physical layer DCI.

Optionally, in an embodiment of the present disclosure, the terminal device sends the first information to the network device on the at least one cell other than the first secondary cell through the PUCCH or the MAC CE.

It should be understood that the steps in the wireless communication method 300 may refer to the corresponding steps in the wireless communication method 200, which are not repeated here for brevity.

Therefore, in the embodiments of the present disclosure, the BFR procedure may be applied to the scenario with multiple serving cells to increase the probability of BFR success, thereby improving the beam failure recovery performance.

FIG. 4 is a schematic flowchart of a wireless communication method 400 according to an embodiment of the present disclosure. As shown in FIG. 4, the method 400 is applied to a CA scenario, and there are at least one primary cell and at least one secondary cell for serving a terminal device. The method 400 may include:

S410, receiving, by the terminal device, first configuration information sent by a network device, wherein the first configuration information is used for indicating the terminal device to perform a first beam failure recovery procedure or a second beam failure recovery procedure when a beam failure occurs in a first secondary cell, and the first secondary cell belongs to the at least one secondary cell; and S420, performing, by the terminal device, beam failure recovery for the first secondary cell according to the first configuration information when the beam failure occurs in the first secondary cell.

Specifically, if the first configuration information configures a no-contention based physical random access channel (PRACH) signal corresponding to each of the at least one candidate beam, the first configuration information indicates the terminal device to perform the first beam failure recovery procedure; or if the first configuration information does not configure the no-contention based PRACH signal corresponding to each of the at least one candidate beam, or if the first configuration information configures the terminal device to perform the second beam failure recover procedure, the first configuration information indicates the terminal device to perform the second beam failure recovery procedure.

Optionally, when the first configuration information indicates the terminal device to perform the first beam failure recovery procedure, the terminal device performs the random access on the PRACH signal corresponding to a first beam if it is determined that there is the first beam that satisfies the first condition among the at least one candidate beam; or the terminal device initiates contention-based random access if it is determined that there is no first beam that satisfies the first condition among the at least one candidate beam.

Optionally, the first condition is that at least one of RSRP, RSRQ, and SINR of a signal is greater than a first threshold.

Optionally, when the first configuration information indicates the terminal device to perform the second beam failure recovery procedure, the terminal device sends the first information to the network device on the at least one cell other than the first secondary cell.

Optionally, the first information is one candidate beam selected by the terminal device, or the first information is a group of candidate beams selected by the terminal device, or, the first information is quality information corresponding to the group of candidate beams, respectively.

Specifically, the terminal device sends the first information to the network device on the at least one cell other than the first secondary cell through the PUCCH or the MAC CE.

It should be understood that the steps in the wireless communication method 400 may refer to the corresponding steps in the wireless communication method 200 or the wireless communication method 300. For brevity, details thereof are not described herein again.

Therefore, in the embodiments of the present disclosure, the BFR procedure may be applied to the scenario with multiple serving cells to increase the probability of BFR success, thereby improving the beam failure recovery performance.

FIG. 5 is a schematic flowchart of a wireless communication method 500 according to an embodiment of the present disclosure. As shown in FIG. 5, the method 500 is applied to a CA scenario, and there are at least one primary cell and at least one secondary cell for serving a terminal device. The method 500 may include:

S510, sending, by a network device, first configuration information that assists the terminal device in performing beam failure recovery for a first secondary cell to the terminal device, wherein the first secondary cell belongs to the at least one secondary cell.

Optionally, the first configuration information is used for configuring no-contention based at least one first PRACH signal and at least one second PRACH signal, wherein the at least one first PRACH signal corresponds to the at least one candidate beam, respectively.

Optionally, if the terminal device selects one second PRACH signal from the at least one second PRACH signal for the random access, the network device does not need to send a random access response on search space for the beam failure recovery defined on a control resource set for beam failure recovery.

Optionally, if the terminal device selects one second PRACH signal from the at least one second PRACH signal for the random access, the network device sends first signaling to the terminal device through another cell other than the first secondary cell, wherein the first signaling indicates the terminal device to perform measurement or report, or activation configuration, or configuration on the first secondary cell.

Further, in an embodiments of the present disclosure, the network device sends first indication information to the terminal device, wherein the first indication information is used for indicating to activate a TCI state or for indicating to configure the TCI state.

Optionally, the first indication information is at least one of RRC signaling, MAC CE signaling, and physical layer DCI.

Optionally, in an embodiment of the present disclosure, the first configuration information is also used for configuring a no-contention based PRACH signal corresponding to each of the at least one candidate beam.

It should be understood that the steps in the wireless communication method 500 may refer to the corresponding steps in the wireless communication method 200 or the wireless communication method 300, and for the sake of brevity, details thereof are not repeated here.

Therefore, in the embodiments of the present disclosure, the BFR procedure may be applied to the scenario with multiple serving cells to increase the probability of BFR success, thereby improving the beam failure recovery performance.

FIG. 6 is a schematic flowchart of a wireless communication method 600 according to an embodiment of the present disclosure. As shown in FIG. 6, the method 600 is applied to a CA scenario, and there are at least one primary cell and at least one secondary cell for serving a terminal device. The method 600 may include:

S610, receiving, by a network device, first information sent by the terminal device on at least one cell other than a first secondary cell when a beam failure occurs in the first secondary cell and it is determined that there is no candidate beam that satisfies a first condition among at least one candidate beam, wherein the first information is used for indicating a beam condition on the first secondary cell, and the first secondary cell belongs to the at least one secondary cell.

Optionally, the first information is that the beam failure has occurred on the first secondary cell, or the first information is that the beam failure has occurred on the first secondary cell, and there is no candidate beam that satisfies the first condition among the at least one candidate beam, or the first information is that the beam failure has occurred on the first secondary cell, and is quality information of some or all of the at least one candidate beam.

Optionally, the first condition is that at least one of RSRP, RSRQ, and SINR of the signal is greater than a first threshold.

Optionally, in an embodiment of the present disclosure, the network device sends first configuration information to the terminal device, wherein the first configuration information is used for configuring the first threshold.

Optionally, in an embodiment of the present disclosure, the network device sends first signaling to the terminal device through another cell other than the first secondary cell, wherein the first signaling indicates the terminal device to perform measurement or report, or activation configuration, or configuration on the first secondary cell.

Optionally, in an embodiment of the present disclosure, the network device sends first indication information to the terminal device, wherein the first indication information is used for indicating to activate a TCI state or for indicating to configure the TCI state.

Optionally, the first indication information is at least one of RRC signaling, MAC CE signaling, and physical layer DCI.

Specifically, the network device receives the first information sent by the terminal device on the at least one cell other than the first secondary cell through PUCCH or MAC CE.

It should be understood that the steps in the wireless communication method 600 may refer to the corresponding steps in the wireless communication method 200 or the wireless communication method 300. For brevity, details thereof are not described herein again.

Therefore, in the embodiments of the present disclosure, the BFR procedure may be applied to the scenario with multiple serving cells to increase the probability of BFR success, thereby improving the beam failure recovery performance.

Figure 7:
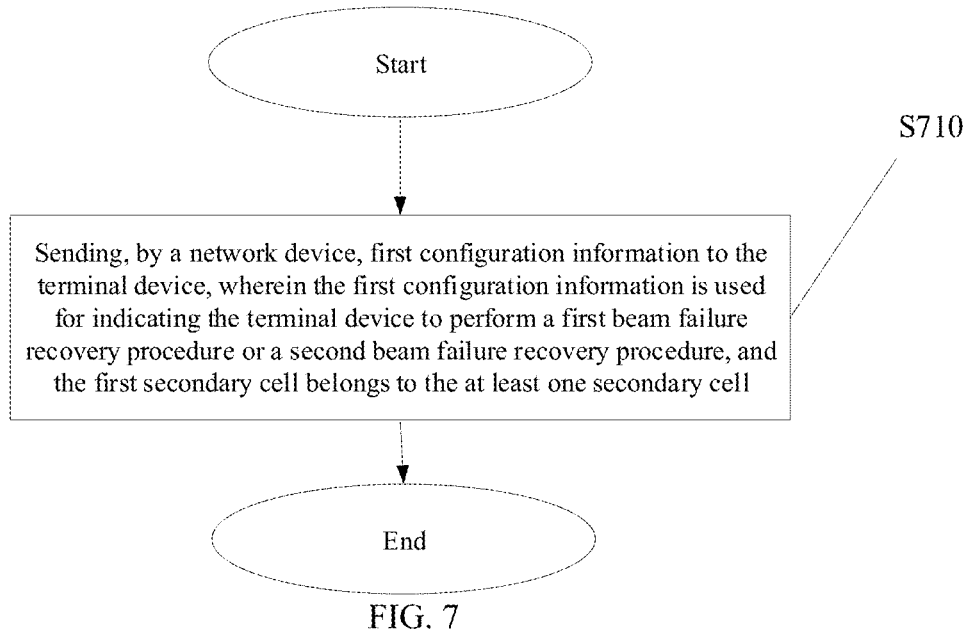
FIG. 7 is a schematic flowchart of still another wireless communication method provided by an embodiment of the present disclosure.

FIG. 7 is a schematic flowchart of a wireless communication method 700 according to an embodiment of the present disclosure. As shown in FIG. 7, the method 700 is applied to a CA scenario, and there are at least one primary cell and at least one secondary cell for serving a terminal device. The method 700 may include:

S710, sending, by a network device, first configuration information to the terminal device, wherein the first configuration information is used for indicating the terminal device to perform a first beam failure recovery procedure or a second beam failure recovery procedure, and the first secondary cell belongs to the at least one secondary cell.

Optionally, in an embodiment of the present disclosure, if the first configuration information configures a no-contention based PRACH signal corresponding to each of the at least one candidate beam, the first configuration information indicates the terminal device to perform the first beam failure recovery procedure; or if the first configuration information does not configure the no-contention based PRACH signal corresponding to each of the at least one candidate beam, or if the first configuration information configures the terminal device to perform the second beam failure recovery procedure, the first configuration information indicates the terminal device to perform the second beam failure recovery procedure.

Optionally, in an embodiment of the present disclosure, when the first configuration information indicates the terminal device to perform the second beam failure recovery procedure, the network device receives the first information sent by the terminal device on at least one cell other than the first secondary cell.

Optionally, in an embodiment of the application, the first information is one candidate beam selected by the terminal device, or the first information is a group of candidate beams selected by the terminal device, or the first information is quality information corresponding to the group of candidate beams, respectively.

Specifically, the network device receives the first information sent by the terminal device on the at least one cell other than the first secondary cell through the PUCCH or the MAC CE.

It should be understood that the steps in the wireless communication method 700 may refer to the corresponding steps in the wireless communication method 200 or the wireless communication method 300, and for the sake of brevity, details thereof are not repeated here.

Therefore, in the embodiments of the present disclosure, the BFR procedure may be applied to the scenario with multiple serving cells to increase the probability of BFR success, thereby improving the beam failure recovery performance.

Figure 8:
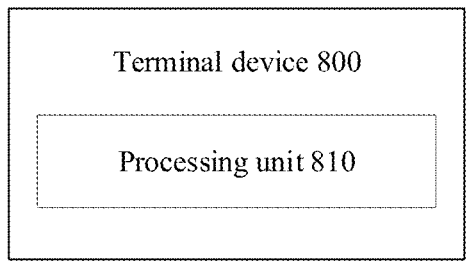
FIG. 8 is a schematic block diagram of a terminal device provided by an embodiment of the present disclosure.

FIG. 8 shows a schematic block diagram of a terminal device 800 according to an embodiment of the present disclosure. As shown in FIG. 8, the terminal device 800 is applied to a CA scenario, and there are at least one primary cell and at least one secondary cell for serving the terminal device 800, and the terminal device 800 includes:

a processing unit 810, configured to determine whether there is a candidate beam that satisfies a first condition among at least one candidate beam when a beam failure occurs in a first secondary cell, wherein the first condition is that at least one of RSRP, RSRQ, and SINR of the signal is greater than a first threshold, and the first secondary cell belongs to the at least one secondary cell.

The processing unit 810 is further configured to determine whether to perform beam failure recovery for the first secondary cell according to a determination result.

Optionally, the processing unit 810 is specifically configured to:

determine not to perform the beam failure recovery for the first secondary cell if it is determined that there is no first beam that satisfies the first condition among the at least one candidate beam.

Optionally, the processing unit 810 is specifically configured to:

determine to perform the beam failure recovery for the first secondary cell when it is determined that there is no first beam that satisfies the first condition among the at least one candidate beam, or when it is determined that there is the first beam that satisfies the first condition among the at least one candidate beam.

Optionally, the terminal device 800 further includes:

a communication unit 820, configured to receive first configuration information sent by a network device, wherein the first configuration information is used for configuring no-contention based at least one first PRACH signal and at least one second PRACH signal, wherein the at least one first PRACH signal corresponds to the at least one candidate beam, respectively;

The processing unit 810 is specifically configured to:

perform random access based on a first PRACH signal corresponding to the first beam if it is determined that there is the first beam that satisfies the first condition among the at least one candidate beam; or select one second PRACH signal from the at least one second PRACH signal for the random access if it is determined that there is no beam that satisfies the first condition among the at least one candidate beam.

Optionally, if the terminal device selects one second PRACH signal from the at least one second PRACH signal for the random access, the communication unit 820 is further configured to perform no listening to search space for the beam failure recovery defined on a control resource set for beam failure recovery.

Optionally, if the terminal device 800 selects one second PRACH signal from the at least one second PRACH signal for the random access, the communication unit 820 is further configured to receive first signaling sent by the network device through another cell other than the first secondary cell, wherein the first signaling indicates the terminal device to perform measurement or report, or activation configuration, or configuration on the first secondary cell; and the processing unit 810 is further configured to perform a corresponding procedure on the first secondary cell in response to the first signaling.

Optionally, the communication unit 820 is further configured to receive first indication information sent by the network device, wherein the first indication information is used for indicating to activate a TCI state or for indicating to configure the TCI state.

Optionally, the first indication information is at least one of RRC signaling, MAC CE signaling, and physical layer DCI.

Optionally, the terminal device 800 further includes:

a communication unit 820, configured to receive second configuration information sent by the network device, wherein the second configuration information is used for configuring a no-contention based PRACH signal corresponding to each of the at least one candidate beam;

The processing unit 810 is specifically configured to:

perform random access based on a PRACH signal corresponding to the first beam if it is determined that there is the first beam that satisfies the first condition among the at least one candidate beam; or perform the random access based on the PRACH signal corresponding to the candidate beam with the best quality among the at least one candidate beam if it is determined that there is no beam that satisfies the first condition among the at least one candidate beam; or perform the random access based on the PRACH signal corresponding to one candidate beam selected by itself from the at least one candidate beam if it is determined that there is no beam that satisfies the first condition among the at least one candidate beam.

Optionally, the terminal device 800 further includes:

a communication unit 820, configured to receive third configuration information sent by the network device, wherein the third configuration information is used for configuring a no-contention based PRACH signal corresponding to each of the at least one candidate beam on multiple cells.

The processing unit 810 is specifically configured to:

determine the PRACH signal corresponding to the first beam according to a first rule, and perform random access based on the PRACH corresponding to the first beam if it is determined that there is the first beam that satisfies the first condition among the at least one candidate beam.

Optionally, the first rule includes:

that the PRACH signal corresponding to the first beam is selected by the terminal device itself, or that a PRACH signal in a same cell as the first beam is preferentially selected as the PRACH signal corresponding to the first beam, or that the PRACH signal configured on a primary cell for a master cell group and the PRACH signal configured on a primary secondary cell for a secondary cell group are preferentially selected as the PRACH signal corresponding to the first beam, and the PRACH signal configured on a secondary cell is secondly selected as the PRACH signal corresponding to the first beam, or that a sequence of selecting the following as the PRACH signal corresponding to the first beam is: the PRACH signal configured on the primary cell for the master cell group>the PRACH signal configured on the primary secondary cell for the secondary cell group>the PRACH signal configured on the secondary cell, or that the PRACH signal corresponding to the first beam is selected according to a cell identification sequence, or that the PRACH signal corresponding to the first beam is selected according to an identification sequence of carriers corresponding to a cell.

Optionally, the processing unit 810 is specifically configured to:

determine whether there is the candidate beam that satisfies the first condition among the at least one candidate beam by measuring the CSI-RS and/or the synchronization signal block.

Optionally, the first threshold is pre-configured or configured by the network device.

It should be understood that the terminal device 800 according to the embodiments of the present disclosure may correspond to the terminal device in the method embodiments of the present disclosure, and the above-mentioned and other operations and/or functions of respective units in the terminal device 800 are respectively for implementing the corresponding process of the terminal device in the method 200 shown in FIG. 2. For the sake of brevity, details thereof will not be repeated here.

Figure 9:
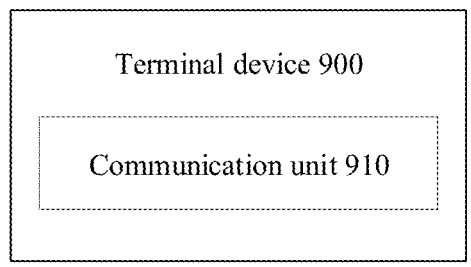
FIG. 9 is a schematic block diagram of another terminal device provided by an embodiment of the present disclosure.

FIG. 9 shows a schematic block diagram of a terminal device 900 according to an embodiment of the present disclosure. As shown in FIG. 9, the terminal device 900 is applied to a CA scenario, and there are at least one primary cell and at least one secondary cell for serving the terminal device 900, and the terminal device 900 includes:

a communication unit 910, configured to send first information to a network device on at least one cell other than a first secondary cell when a beam failure occurs in the first secondary cell and it is determined that there is no candidate beam that satisfies a first condition among at least one candidate beam, wherein the first information is used for indicating a beam condition on the first secondary cell, and the first secondary cell belongs to the at least one secondary cell.

Optionally, the first information is that the beam failure has occurred on the first secondary cell, or the first information is that the beam failure has occurred on the first secondary cell, and there is no beam that satisfies the first condition among the at least one candidate beam, or the first information is that the beam failure has occurred on the first secondary cell, and is quality information of some or all of the at least one candidate beam.

Optionally, the first condition is that at least one of RSRP, RSRQ, and SINR of the signal is greater than a first threshold.

Optionally, the first threshold is pre-configured or configured by the network device.

Optionally, the terminal device 900 further includes:

the communication unit 910, further configured to receive first signaling sent by the network device through another cell other than the first secondary cell, wherein the first signaling indicates the terminal device to perform measurement or report, or activation configuration, or configuration on the first secondary cell; and a processing unit 920, configured to perform a corresponding procedure on the first secondary cell in response to the first signaling.

Optionally, the communication unit 910 is further configured to receive first indication information sent by the network device, wherein the first indication information is used for indicating to activate a TCI state or for indicating to configure the TCI state.

Optionally, the first indication information is at least one of RRC signaling, MAC CE signaling, and physical layer DCI.

Optionally, the communication unit 910 is specifically configured to:

send the first information to the network device on the at least one cell other than the first secondary cell through a PUCCH or MAC CE.

It should be understood that the terminal device 900 according to the embodiments of the present disclosure may correspond to the terminal device in the method embodiments of the present disclosure, and the above-mentioned and other operations and/or functions of respective units in the terminal device 900 are respectively for implementing the corresponding process of the terminal device in the method 300 shown in FIG. 3. For the sake of brevity, details thereof will not be repeated here.

Figure 10:
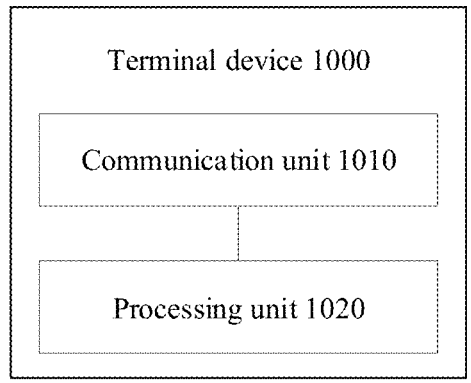
FIG. 10 is a schematic block diagram of still another terminal device provided by an embodiment of the present disclosure.

FIG. 10 shows a schematic block diagram of a terminal device 1000 according to an embodiment of the present disclosure. As shown in FIG. 10, the terminal device 1000 is applied to a CA scenario, and there are at least one primary cell and at least one secondary cell for serving the terminal device 1000, and the terminal device 1000 includes:

a communication unit 1010, further configured to receive first configuration information sent by a network device, wherein the first configuration information is used for indicating the terminal device to perform a first beam failure recovery procedure or a second beam failure recovery procedure when a beam failure occurs in a first secondary cell, and the first secondary cell belongs to the at least one secondary cell; and a processing unit 1020, further configured to perform beam failure recovery for the first secondary cell according to the first configuration information when the beam failure occurs in the first secondary cell.

Optionally, if the first configuration information configures a no-contention based PRACH signal corresponding to each of the at least one candidate beam, the first configuration information indicates the terminal device to perform the first beam failure recovery procedure; or if the first configuration information does not configure the no-contention based PRACH signal corresponding to each of the at least one candidate beam, or if the first configuration information configures the terminal device to perform the second beam failure recover procedure, the first configuration information indicates the terminal device to perform the second beam failure recovery procedure.

Optionally, when the first configuration information indicates the terminal device to perform the first beam failure recovery procedure, the processing unit 1020 is specifically configured to:

perform random access on the PRACH signal corresponding to a first beam if it is determined that there is the first beam that satisfies the first condition among the at least one candidate beam; or initiate contention-based random access if it is determined that there is no first beam that satisfies the first condition among the at least one candidate beam.

Optionally, the first condition is that at least one of RSRP, RSRQ, and SINR of the signal is greater than a first threshold.

Optionally, when the first configuration information indicates the terminal device to perform the second beam failure recovery procedure, the processing unit 1020 is specifically configured to:

control the communication unit 1010 to send the first information to the network device on the at least one cell other than the first secondary cell.

Optionally, the first information is a candidate beam selected by the terminal device, or the first information is a group of candidate beams selected by the terminal device, or the first information is quality information corresponding to the group of candidate beams, respectively.

Optionally, the communication unit 1010 is specifically configured to:

send the first information to the network device on the at least one cell other than the first secondary cell through the PUCCH or the MAC CE.

It should be understood that the terminal device 1000 according to the embodiments of the present disclosure may correspond to the terminal device in the method embodiments of the present disclosure, and the above-mentioned and other operations and/or functions of respective units in the terminal device 1000 are respectively for implementing the corresponding process of the terminal device in the method 400 shown in FIG. 4. For the sake of brevity, details thereof will not be repeated here.

Figure 11:
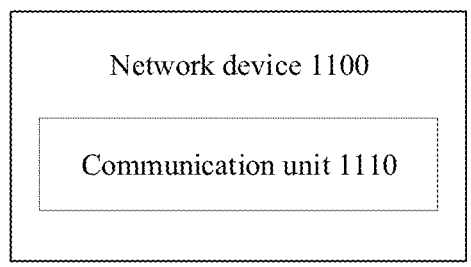
FIG. 11 is a schematic block diagram of a network device provided by an embodiment of the present disclosure.

FIG. 11 shows a schematic block diagram of a network device 1100 according to an embodiment of the present disclosure. As shown in FIG. 11, the network device 1100 is applied to a CA scenario, and there are at least one primary cell and at least one secondary cell for serving a terminal device. The network device 1100 includes:

a communication unit 1110, configured to send first configuration information that assists the terminal device in performing beam failure recovery for a first secondary cell to the terminal device, wherein the first secondary cell belongs to the at least one secondary cell.

Optionally, the first configuration information is used for configuring no-contention based at least one first PRACH signal and at least one second PRACH signal, wherein the at least one first PRACH signal corresponds to the at least one candidate beam, respectively.

Optionally, if the terminal device selects one second PRACH signal from the at least one second PRACH signal for the random access, the communication unit 1110 is further configured to send no random access response on search space for the beam failure recovery defined on a control resource set for beam failure recovery.

Optionally, if the terminal device selects one second PRACH signal from the at least one second PRACH signal for the random access, the communication unit 1110 is further configured to send first signaling to the terminal device through another cell other than the first secondary cell, wherein the first signaling indicates the terminal device to perform measurement or report, or activation configuration, or configuration on the first secondary cell.

Optionally, the communication unit 1110 is further configured to send first indication information to the terminal device, wherein the first indication information is used for indicating to activate a TCI state or for indicating to configure the TCI state.

Optionally, the first indication information is at least one of RRC signaling, MAC CE signaling, and physical layer DCI.

Optionally, the first configuration information is used for configuring a no-contention based PRACH signal corresponding to each of the at least one candidate beam.

It should be understood that the network device 1100 according to the embodiments of the present disclosure may correspond to the network device in the method embodiments of the present disclosure, and the above-mentioned and other operations and/or functions of respective units in the network device 1100 are respectively for implementing the corresponding process of the network device in the method 500 shown in FIG. 5. For the sake of brevity, details thereof will not be repeated here.

Figure 12:
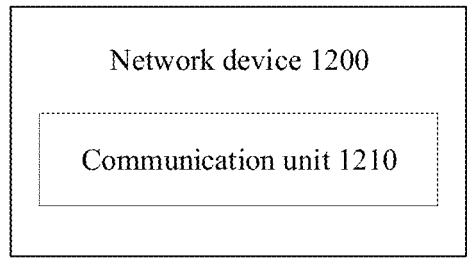
FIG. 12 is a schematic block diagram of another network device provided by an embodiment of the present disclosure.

FIG. 12 shows a schematic block diagram of a network device 1200 according to an embodiment of the present disclosure. As shown in FIG. 12, the network device 1200 is applied to a CA scenario, and there are at least one primary cell and at least one secondary cell for serving a terminal device. The network device 1200 includes:

a communication unit 1210, configured to receive first information sent by the terminal device on at least one cell other than a first secondary cell when a beam failure occurs in the first secondary cell and it is determined that there is no candidate beam that satisfies a first condition among at least one candidate beam, wherein the first information is used for indicating a beam condition on the first secondary cell, and the first secondary cell belongs to the at least one secondary cell.

Optionally, the first information is that the beam failure has occurred on the first secondary cell, or the first information is that the beam failure has occurred on the first secondary cell, and there is no candidate beam that satisfies the first condition among the at least one candidate beam, or the first information is that the beam failure has occurred on the first secondary cell, and is quality information of some or all of the at least one candidate beam.

Optionally, the first condition is that at least one of RSRP, RSRQ, and SINR of the signal is greater than a first threshold.

Optionally, the communication unit 1210 is further configured to send first configuration information to the terminal device, wherein the first configuration information is used for configuring the first threshold.

Optionally, the communication unit 1210 is further configured to send first signaling to the terminal device through another cell other than the first secondary cell, wherein the first signaling indicates the terminal device to perform measurement or report, or activation configuration, or configuration on the first secondary cell.

Optionally, the communication unit 1210 is further configured to send first indication information to the terminal device, wherein the first indication information is used for indicating to activate a TCI state or for indicating to configure the TCI state.

Optionally, the first indication information is at least one of RRC signaling, MAC CE signaling, and physical layer DCI.

Optionally, the communication unit 1210 is specifically configured to:

receive the first information sent by the terminal device on the at least one cell other than the first secondary cell through the PUCCH or MAC CE.

It should be understood that the network device 1200 according to the embodiments of the present disclosure may correspond to the network device in the method embodiments of the present disclosure, and the above-mentioned and other operations and/or functions of respective units in the network device 1200 are respectively for implementing the corresponding process of the network device in the method 600 shown in FIG. 6. For the sake of brevity, details thereof will not be repeated here.

Figure 13:
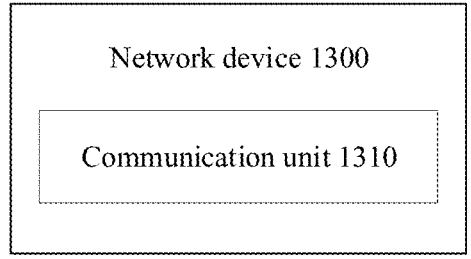
FIG. 13 is a schematic block diagram of still another network device provided by an embodiment of the present disclosure.

FIG. 13 shows a schematic block diagram of a network device 1300 according to an embodiment of the present disclosure. As shown in FIG. 13, the network device 1300 is applied to a CA scenario, and there are at least one primary cell and at least one secondary cell for serving a terminal device. The network device 1300 includes:

a communication unit 1310, configured to send first configuration information to the terminal device, wherein the first configuration information is used for indicating the terminal device to perform a first beam failure recovery procedure or a second beam failure recovery procedure, and the first secondary cell belongs to the at least one secondary cell.

Optionally, if the first configuration information configures a no-contention based PRACH signal corresponding to each of the at least one candidate beam, the first configuration information indicates the terminal device to perform the first beam failure recovery procedure; or if the first configuration information does not configure the no-contention based PRACH signal corresponding to each of the at least one candidate beam, or if the first configuration information configures the terminal device to perform the second beam failure recover procedure, the first configuration information indicates the terminal device to perform the second beam failure recovery procedure.

Optionally, when the first configuration information indicates the terminal device to perform the second beam failure recovery procedure, the communication unit 1310 is further configured to receive the first information sent by the terminal device on at least one cell other than the first secondary cell.

Optionally, the first information is one candidate beam selected by the terminal device, or the first information is a group of candidate beams selected by the terminal device, or the first information is quality information corresponding to the group of candidate beams, respectively.

Optionally, the communication unit 1310 is specifically configured to:

receive the first information sent by the terminal device on the at least one cell other than the first secondary cell through PUCCH or MAC CE.

It should be understood that the network device 1300 according to the embodiments of the present disclosure may correspond to the network device in the method embodiments of the present disclosure, and the above-mentioned and other operations and/or functions of respective units in the network device 1300 are respectively for implementing the corresponding process of the network device in the method 700 shown in FIG. 7. For the sake of brevity, details thereof will not be repeated here.

Figure 14:
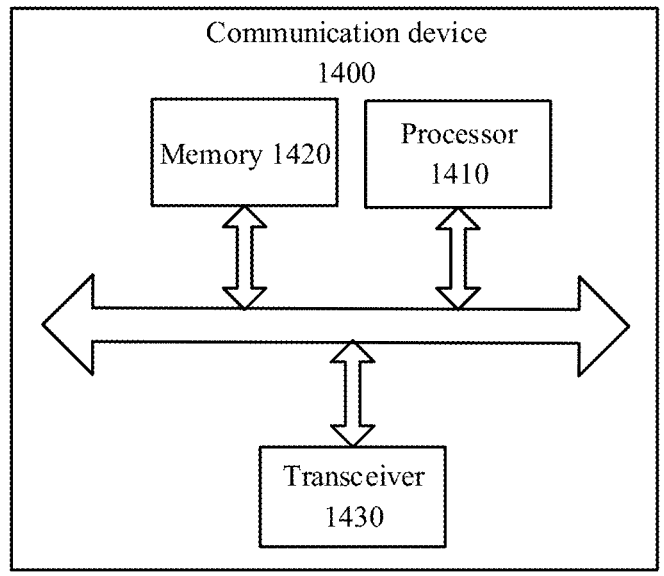
FIG. 14 is a schematic block diagram of a communication device provided by an embodiment of the present disclosure.

FIG. 14 is a schematic structural diagram of a communication device 1400 according to an embodiment of the present disclosure. The communication device 1400 shown in FIG. 14 includes a processor 1410. The processor 1410 may invoke a computer program from a memory and run the computer program, to implement the method in the embodiments of the present disclosure.

Optionally, as shown in FIG. 14, the communication device 1400 may further include a memory 1420. The processor 1410 may invoke the computer program from the memory 1420 and run the computer program, to implement the method in the embodiments of the present disclosure.

The memory 1420 may be a component independent of the processor 1410, or may be integrated into the processor 1410.

Optionally, as shown in FIG. 14, the communication device 1400 may further include a transceiver 1430. The processor 1410 may control the transceiver 1430 to communicate with another device, and specifically, the transceiver 1430 may transmit information or data to another device, or receive information or data transmitted by another device.

The transceiver 1430 may include a transmitter and a receiver. The transceiver 1430 may further include an antenna. There may be one or more antennas.

Optionally, the communication device 1400 may be the mobile terminal/terminal in the embodiments of the present disclosure, and the communication device 1400 can implement corresponding procedures implemented by the mobile terminal/terminal device in various methods in the embodiments of the present disclosure. For brevity, details thereof are not described herein again.

Optionally, the communication device 1400 may be the network device in the embodiments of the present disclosure, and the communication device 1400 can implement corresponding procedures implemented by the network device in various methods in the embodiments of the present disclosure. For brevity, details thereof are not described herein again.

Figure 15:
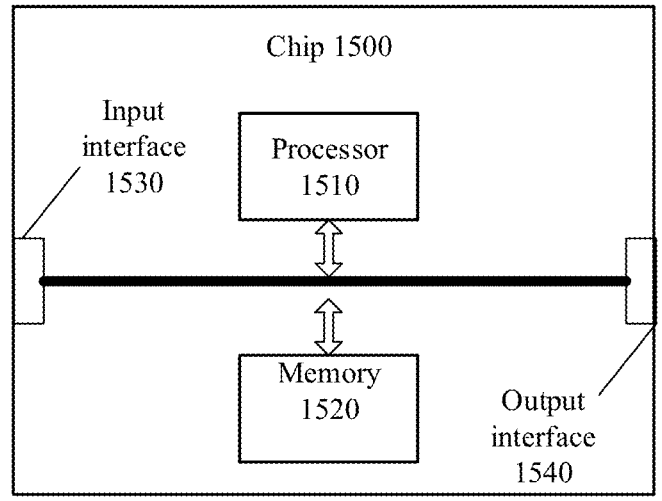
FIG. 15 is a schematic block diagram of a chip provided by an embodiment of the present disclosure.

FIG. 15 is a schematic structural diagram of a chip according to an embodiment of the present disclosure. The chip 1500 shown in FIG. 15 includes a processor 1510. The processor 1510 may invoke a computer program from a memory and run the computer program, to implement the method in the embodiments of the present disclosure.

Optionally, as shown in FIG. 15, the chip 1500 may further include a memory 1520. The processor 1510 may invoke the computer program from the memory 1520 and run the computer program, to implement the method in the embodiments of the present disclosure.

The memory 1520 may be a component independent of the processor 1510, or may be integrated into the processor 1510.

Optionally, the chip 1500 may further include an input interface 1530. The processor 1510 may control the input interface 1530 to communicate with another device or chip, and specifically, the input interface 1530 may obtain information or data transmitted by another device or chip.

Optionally, the chip 1500 may further include an output interface 1540. The processor 1510 may control the output interface 1540 to communicate with another device or chip, and specifically, the output interface 1540 may output information or data to another device or chip Optionally, the chip may be applied in the network device according to embodiments of the present disclosure, and the chip can implement corresponding procedures implemented by the network device in various methods in the embodiments of the present disclosure. For brevity, details thereof are not described herein again.

Optionally, the chip may be applied to the mobile terminal/terminal device in the embodiments of the present disclosure, and the chip can implement corresponding procedures implemented by the mobile terminal/terminal device in various methods in the embodiments of the present disclosure. For brevity, details thereof are not described herein again.

It should be noted that, the chip mentioned in the embodiments of the present disclosure may also be referred to as a system-level chip, a system chip, a chip system, a system on chip, or the like.

Figure 16:
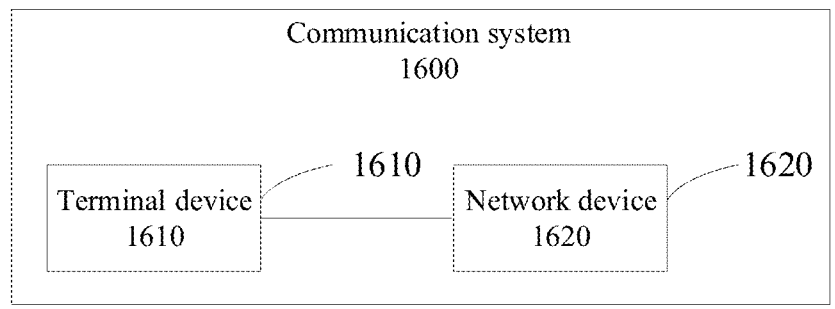
FIG. 16 is a schematic block diagram of a communication system provided by an embodiment of the present disclosure.

FIG. 16 is a schematic structural diagram of a communication system 1600 according to an embodiment of the present disclosure. The communication system 1600 shown in FIG. 16 includes a terminal device 1610 and a network device 1620.

The terminal device 1610 can implement corresponding functions implemented by the terminal device in the foregoing method and the network device 1620 can implement corresponding functions implemented by the network device in the foregoing method. For brevity, details thereof are not described herein again.

It should be understood that, the processor of the embodiments of the present disclosure may be an integrated circuit chip, and has a signal processing capability. In the implementation, the steps of the foregoing method embodiment may be implemented by using a hardware integrated logic circuit in the processor and/or implemented by using an instruction in a software form. The foregoing processor may be a general purpose processor, a digital signal processor (DSP), an application specific integrated circuit (ASIC), a field programmable gate array (FPGA) or another programmable logic device, a discrete gate or transistor logic device, or a discrete hardware component. The respective methods, steps and logic blocks disclosed in the embodiments of the present disclosure may be implemented or executed. The foregoing general purpose processor may be a microprocessor, or may be any conventional processor, or the like. Steps of the methods disclosed with reference to the embodiments of the present disclosure may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing method in combination with hardware of the processor.

It should be understood that, the memory in the embodiments of the present disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), and is used as an external cache. By way of examples but of no limitation, many forms of RAM are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synclink dynamic random access memory (SLDRAM), and a direct rambus random access memory (DR RAM). It should be noted that, the memory of the system and the method described herein is intended to include but is not limited to these memories and any other suitable type of memory.

It should be understood that, the above memory is an example but is not intended for limitation. For example, the memory in the embodiments of the present disclosure may alternatively be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), and the like. That is, the memory described in this embodiment of the present disclosure is intended to include but is not limited to these memories and any other suitable type of memory.

An embodiment of the present disclosure further provides a computer readable storage medium. The computer readable storage medium is configured to store a computer program.

Optionally, the computer readable storage medium may be applied to the network device in the embodiments of the present disclosure, and the computer program enables a computer to execute the corresponding procedure implemented by the network device in the methods of the embodiments of the present disclosure. For brevity, details thereof are not described herein again.

Optionally, the computer readable storage medium may be applied to the mobile terminal/terminal device in the embodiments of the present disclosure, and the computer program enables the computer to execute the corresponding procedure implemented by the mobile terminal/terminal device in the methods of the embodiments of the present disclosure. For brevity, details thereof are not described herein again.

An embodiment of the present disclosure further provides a computer program product. The computer program product includes a computer program instruction.

Optionally, the computer program product may be applied to the network device in the embodiments of the present disclosure, and the computer program instruction enables the computer to execute the corresponding procedure implemented by the network device in the methods of the embodiments of the present disclosure. For brevity, details thereof are not described herein again.

Optionally, the computer program product may be applied to the mobile terminal/terminal device in the embodiments of the present disclosure, and the computer program instruction enables the computer to execute the corresponding procedure implemented by the mobile terminal/terminal device in the methods of the embodiments of the present disclosure. For brevity, details thereof are not described herein again.

An embodiment of the present disclosure further provides a computer program.

Optionally, the computer program may be applied to the network device in the embodiments of the present disclosure, and when running on a computer, the computer program instruction enables the computer to execute the corresponding procedure implemented by the network device in the methods of the embodiments of the present disclosure. For brevity, details thereof are not described herein again.

Optionally, the computer program may be applied to the mobile terminal/terminal device in the embodiments of the present disclosure, and when running on a computer, the computer program instruction enables the computer to execute the corresponding procedure implemented by the mobile terminal/terminal device in the methods of the embodiments of the present disclosure. For brevity, details thereof are not described herein again.

A person of ordinary skill in the art may be aware that, units and algorithm steps in the examples described in combination with the embodiments disclosed herein may be implemented by using electronic hardware or a combination of computer software and electronic hardware. Whether these functions are executed by means of hardware or software depends on specific applications and design constraints of the technical solutions. A person skilled in the art may use different methods to implement the described functions for each particular application, but it should not be considered that the implementation goes beyond the scope of the present disclosure.

A person skilled in the art may clearly understand that, for simple and clear description, for specific work processes of the foregoing described system, apparatus, and unit, reference may be made to corresponding process in the foregoing method embodiments, and details thereof are not described herein again.

In the several embodiments provided in the present disclosure, it should be understood that the disclosed system, apparatus, and method may be implemented in other manners. For example, the apparatus embodiments described above are merely examples. For example, the unit division is merely logical function division, and there may be other division manners in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and the parts displayed as units may or may not be physical units, may be located in one position, or may be distributed on multiple network units. Some of or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

Described above are merely specific implementations of the present disclosure, but the protection scope of the present disclosure is not limited thereto. Changes or replacements readily figured out by any person skilled in the art within the technical scope disclosed in the present disclosure shall be covered by the protection scope of the present disclosure. Therefore, the protection scope of the present disclosure shall be subject to the protection scope of the claims.

What is claimed is:

1. A wireless communication method, wherein the method is applied to a carrier aggregation (CA) scenario, and there are at least one primary cell and at least one secondary cell for serving a terminal device, and the method comprises:
    determining, by the terminal device, whether there is a candidate beam that satisfies a first condition in at least one candidate beam when a beam failure occurs in a first secondary cell, wherein the first condition is that at least one of reference signal receiving power (RSRP), reference signal receiving quality (RSRQ), and signal to interference plus noise ratio (SINR) of a signal is greater than a first threshold, and the first secondary cell belongs to the at least one secondary cell; and
    determining, by the terminal device, whether to perform beam failure recovery for the first secondary cell according to a determination result,
    wherein determining, by the terminal device, whether to perform the beam failure recovery for the first secondary cell according to the determination result comprises:
        determining, by the terminal device, to perform the beam failure recovery for the first secondary cell when it is determined that there is no first beam that satisfies the first condition in the at least one candidate beam, or when it is determined that there is the first beam that satisfies the first condition in the at least one candidate beam,
    wherein the method further comprises:
        receiving, by the terminal device, first configuration information sent by a network device, wherein the first configuration information is used for configuring no-contention based at least one first physical random access channel (PRACH) signal and at least one second PRACH signal, wherein the at least one first PRACH signal corresponds to the at least one candidate beam respectively,
    wherein determining, by the terminal device, to perform the beam failure recovery for the first secondary cell comprises:
        performing, by the terminal device, random access based on a first PRACH signal corresponding to the first beam if it is determined that there is the first beam that satisfies the first condition in the at least one candidate beam; or
        selecting, by the terminal device, one second PRACH signal from the at least one second PRACH signal for the random access if it is determined that there is no beam that satisfies the first condition in the at least one candidate beam,
    wherein if the terminal device selects one second PRACH signal from the at least one second PRACH signal for the random access, the method further comprises:
        performing, by the terminal device, no listening on search space for the beam failure recovery defined on a control resource set for the beam failure recovery.

2. The method according to claim 1, wherein if the terminal device selects one second PRACH signal from the at least one second PRACH signal for the random access, the method further comprises:
    receiving, by the terminal device, first signaling sent by the network device through another cell other than the first secondary cell, wherein the first signaling indicates the terminal device to perform measurement or report, or activation configuration, or configuration on the first secondary cell; and
    performing, by the terminal device, a corresponding procedure on the first secondary cell in response to the first signaling.

3. The method according to claim 2, wherein the method further comprises:
    receiving, by the terminal device, first indication information sent by the network device, wherein the first indication information is used for indicating to activate a transmission configuration indicator (TCI) state or for indicating to configure the TCI state.

4. The method according to claim 1, wherein the method further comprises:
    receiving, by the terminal device, second configuration information sent by the network device, wherein the second configuration information is used for configuring a no-contention based PRACH signal corresponding to each of the at least one candidate beam, and
    wherein determining, by the terminal device, to perform the beam failure recovery for the first secondary cell comprises:
        performing, by the terminal device, random access based on the PRACH signal corresponding to the first beam if it is determined that there is the first beam that satisfies the first condition in the at least one candidate beam; or
        performing, by the terminal device, the random access based on the PRACH signal corresponding to the candidate beam with best quality in the at least one candidate beam if it is determined that there is no beam that satisfies the first condition in the at least one candidate beam; or
        performing, by the terminal device, the random access based on the PRACH signal corresponding to one candidate beam selected by itself from the at least one candidate beam if it is determined that there is no beam that satisfies the first condition in the at least one candidate beam.

5. The method according to claim 1, wherein the method further comprises:
    receiving, by the terminal device, third configuration information sent by the network device, wherein the third configuration information is used for configuring a non-contention based PRACH signal corresponding to each of the at least one candidate beam on multiple cells, and wherein determining, by the terminal device, to perform the beam failure recovery for the first secondary cell comprises:

determining, by the terminal device, the PRACH signal corresponding to the first beam according to a first rule and performing random access based on a PRACH corresponding to the first beam, if it is determined that there is the first beam that satisfies the first condition in the at least one candidate beam.

6. The method according to claim 5, wherein the first rule comprises:

that the PRACH signal corresponding to the first beam is selected by the terminal device itself, or that the PRACH signal in a same cell as the first beam is preferentially selected as the PRACH signal corresponding to the first beam, or that the PRACH signal configured on a primary cell for a master cell group and the PRACH signal configured on a primary secondary cell for a secondary cell group are preferentially selected as the PRACH signal corresponding to the first beam, and the PRACH signal configured on a secondary cell is secondly selected as the PRACH signal corresponding to the first beam, or that a sequence of selecting the following as the PRACH signal corresponding to the first beam is: the PRACH signal configured on the primary cell for the master cell group, the PRACH signal configured on the primary secondary cell for the secondary cell group, and then the PRACH signal configured on the secondary cell, or that the PRACH signal corresponding to the first beam is selected according to a cell identification sequence, or that the PRACH signal corresponding to the first beam is selected according to an identification sequence of carriers corresponding to a cell.

7. The method according to claim 1, wherein determining, by the terminal device, whether there is the candidate beam that satisfies the first condition in the at least one candidate beam comprises:

determining, by the terminal device, whether there is the candidate beam that satisfies the first condition in the at least one candidate beam by measuring at least one of a channel state information reference signal (CSI-RS) and a synchronization signal block.

8. A terminal device, wherein the terminal device is applied to a carrier aggregation (CA) scenario and there are at least one primary cell and at least one secondary cell for serving the terminal device, and the terminal device comprises a processor and a memory, wherein the memory is configured to store a computer program, and the processor is configured to call and run the computer program stored in the memory to execute a wireless communication method comprising:

determining, by the terminal device, whether there is a candidate beam that satisfies a first condition in at least one candidate beam when a beam failure occurs in a first secondary cell, wherein the first condition is that at least one of reference signal receiving power (RSRP), reference signal receiving quality (RSRQ), and signal to interference plus noise ratio (SINR) of a signal is greater than a first threshold, and the first secondary cell belongs to the at least one secondary cell; and determining, by the terminal device, whether to perform beam failure recovery for the first secondary cell according to a determination result, wherein determining, by the terminal device, whether to perform the beam failure recovery for the first secondary cell according to the determination result comprises:

determining, by the terminal device, to perform the beam failure recovery for the first secondary cell when it is determined that there is no first beam that satisfies the first condition in the at least one candidate beam, or when it is determined that there is the first beam that satisfies the first condition in the at least one candidate beam, wherein the method further comprises:

receiving, by the terminal device, first configuration information sent by a network device, wherein the first configuration information is used for configuring no-contention based at least one first physical random access channel (PRACH) signal and at least one second PRACH signal, wherein the at least one first PRACH signal corresponds to the at least one candidate beam respectively, wherein determining, by the terminal device, to perform the beam failure recovery for the first secondary cell comprises:

performing, by the terminal device, random access based on a first PRACH signal corresponding to the first beam if it is determined that there is the first beam that satisfies the first condition in the at least one candidate beam; or selecting, by the terminal device, one second PRACH signal from the at least one second PRACH signal for the random access if it is determined that there is no beam that satisfies the first condition in the at least one candidate beam, wherein if the terminal device selects one second PRACH signal from the at least one second PRACH signal for the random access, the method further comprises:

performing, by the terminal device, no listening on search space for the beam failure recovery defined on a control resource set for the beam failure recovery.

9. The terminal device according to claim 8, wherein if the terminal device selects one second PRACH signal from the at least one second PRACH signal for the random access, the method further comprises:

receiving, by the terminal device, first signaling sent by the network device through another cell other than the first secondary cell, wherein the first signaling indicates the terminal device to perform measurement or report, or activation configuration, or configuration on the first secondary cell; and performing, by the terminal device, a corresponding procedure on the first secondary cell in response to the first signaling.

10. The terminal device according to claim 9, wherein the method further comprises:

receiving, by the terminal device, first indication information sent by the network device, wherein the first indication information is used for indicating to activate a transmission configuration indicator (TCI) state or for indicating to configure the TCI state.

11. The terminal device according to claim 8, wherein the method further comprises:

receiving, by the terminal device, second configuration information sent by the network device, wherein the second configuration information is used for configuring a no-contention based PRACH signal corresponding to each of the at least one candidate beam, and
wherein determining, by the terminal device, to perform the beam failure recovery for the first secondary cell comprises:
  performing, by the terminal device, random access based on the PRACH signal corresponding to the first beam if it is determined that there is the first beam that satisfies the first condition in the at least one candidate beam; or
  performing, by the terminal device, the random access based on the PRACH signal corresponding to the candidate beam with best quality in the at least one candidate beam if it is determined that there is no beam that satisfies the first condition in the at least one candidate beam; or
  performing, by the terminal device, the random access based on the PRACH signal corresponding to one candidate beam selected by itself from the at least one candidate beam if it is determined that there is no beam that satisfies the first condition in the at least one candidate beam.

12. The terminal device according to claim 8, wherein the method further comprises:
  receiving, by the terminal device, third configuration information sent by the network device, wherein the third configuration information is used for configuring a non-contention based PRACH signal corresponding to each of the at least one candidate beam on multiple cells, and
  wherein determining, by the terminal device, to perform the beam failure recovery for the first secondary cell comprises:
    determining, by the terminal device, the PRACH signal corresponding to the first beam according to a first rule and performing random access based on a PRACH corresponding to the first beam, if it is determined that there is the first beam that satisfies the first condition in the at least one candidate beam.

13. The terminal device according to claim 12, wherein the first rule comprises:
  that the PRACH signal corresponding to the first beam is selected by the terminal device itself, or
  that the PRACH signal in a same cell as the first beam is preferentially selected as the PRACH signal corresponding to the first beam, or
  that the PRACH signal configured on a primary cell for a master cell group and the PRACH signal configured on a primary secondary cell for a secondary cell group are preferentially selected as the PRACH signal corresponding to the first beam, and the PRACH signal configured on a secondary cell is secondly selected as the PRACH signal corresponding to the first beam, or
  that a sequence of selecting the following as the PRACH signal corresponding to the first beam is: the PRACH signal configured on the primary cell for the master cell group, the PRACH signal configured on the primary secondary cell for the secondary cell group, and then the PRACH signal configured on the secondary cell, or
  that the PRACH signal corresponding to the first beam is selected according to a cell identification sequence, or
  that the PRACH signal corresponding to the first beam is selected according to an identification sequence of carriers corresponding to a cell.

14. The terminal device according to claim 8, wherein determining, by the terminal device, whether there is the candidate beam that satisfies the first condition in the at least one candidate beam comprises:
  determining, by the terminal device, whether there is the candidate beam that satisfies the first condition in the at least one candidate beam by measuring at least one of a channel state information reference signal (CSI-RS) and a synchronization signal block.

* * * * *